US011509654B2

(12) United States Patent
Schmidt

(10) Patent No.: US 11,509,654 B2
(45) Date of Patent: Nov. 22, 2022

(54) SECURING COMMUNICATION OF DEVICES IN THE INTERNET OF THINGS

(71) Applicant: PCMS HOLDINGS, INC., Wilmington, DE (US)

(72) Inventor: Andreas Schmidt, Kronberg (DE)

(73) Assignee: PCMS Holdings, Inc., Wilmington, DE (US)

( * ) Notice: Subject to any disclaimer, the term of this patent is extended or adjusted under 35 U.S.C. 154(b) by 125 days.

(21) Appl. No.: 16/483,888

(22) PCT Filed: Feb. 6, 2018

(86) PCT No.: PCT/US2018/016971
§ 371 (c)(1),
(2) Date: Aug. 6, 2019

(87) PCT Pub. No.: WO2018/145056
PCT Pub. Date: Aug. 9, 2018

(65) Prior Publication Data
US 2020/0021586 A1   Jan. 16, 2020

Related U.S. Application Data

(60) Provisional application No. 62/455,071, filed on Feb. 6, 2017.

(51) Int. Cl.
*H04W 12/06* (2021.01)
*H04W 8/18* (2009.01)
(Continued)

(52) U.S. Cl.
CPC .......... *H04L 63/0884* (2013.01); *H04L 12/66* (2013.01); *H04L 63/0876* (2013.01);
(Continued)

(58) Field of Classification Search
None
See application file for complete search history.

(56) References Cited

U.S. PATENT DOCUMENTS 8,613,069 B1 * 12/2013 Martini .................. G06F 21/33
455/410
9,356,804 B1 * 5/2016 Passaglia ................ H04L 67/63
(Continued)

FOREIGN PATENT DOCUMENTS

| CN | 102271041 A | 12/2011 |
| CN | 102547680 A | 7/2012 |

(Continued)

OTHER PUBLICATIONS

Lightweight security scheme for IoT applications using CoAP. Ukil etal.IJPCC. (Year: 2014).*
(Continued)

*Primary Examiner* — Venkat Perungavoor
(74) *Attorney, Agent, or Firm* — BakerHostetler

(57) ABSTRACT

It is recognized herein that current messaging protocols for internet of things (IoT) architectures are often weak from a security perspective, and are often poorly suited for resource-constrained devices. An example IoT system described herein combines device authentication and application-layer key establishment using facilities of IoT messaging protocols. The IoT system may include a Trust Broker, which acts as a registration point for devices, and an edge gateway, which manages communication between a given device and the trust broker (and IoT servers). The edge gateway may acquire a trusted role, such that it may be a secure intermediary for device-server messaging, and such that it can facilitate authentication of devices to services.

24 Claims, 8 Drawing Sheets

(51) Int. Cl.

| | |
|---|---|
| *H04L 9/40* | (2022.01) |
| *H04W 4/70* | (2018.01) |
| *H04L 12/66* | (2006.01) |
| *H04W 12/60* | (2021.01) |
| *H04W 12/069* | (2021.01) |
| *H04L 9/12* | (2006.01) |

(52) U.S. Cl.
CPC .............. *H04L 63/10* (2013.01); *H04L 63/20* (2013.01); *H04W 4/70* (2018.02); *H04W 12/069* (2021.01); *H04W 12/66* (2021.01)

(56) References Cited

U.S. PATENT DOCUMENTS

| | | | | |
|---|---|---|---|---|
| 9,860,677 | B1* | 1/2018 | Agerstam | H04W 4/70 |
| 10,079,691 | B2* | 9/2018 | Christopher | H04L 12/66 |
| 10,237,364 | B2* | 3/2019 | Megiddo | H04L 67/563 |
| 10,382,203 | B1* | 8/2019 | Loladia | H04L 63/06 |
| 10,805,115 | B2* | 10/2020 | Ameling | H04L 12/66 |
| 2014/0351573 | A1* | 11/2014 | Martini | H04L 63/0209 713/153 |
| 2014/0359131 | A1* | 12/2014 | Seed | H04L 67/1031 709/226 |
| 2016/0366111 | A1* | 12/2016 | Smith | H04L 63/065 |
| 2017/0006030 | A1 | 1/2017 | Krishnamoorthy et al. | |
| 2017/0364046 | A1* | 12/2017 | Westrick, Jr | G05B 15/02 |
| 2018/0123784 | A1* | 5/2018 | Gehrmann | H04L 9/0891 |
| 2018/0167476 | A1* | 6/2018 | Hoffner | H04L 67/55 |
| 2018/0213378 | A1* | 7/2018 | Brown | H04L 67/12 |
| 2018/0248876 | A1* | 8/2018 | Sakura | H04L 63/0884 |
| 2019/0124590 | A1* | 4/2019 | Chiang | H04L 12/2809 |
| 2019/0253243 | A1* | 8/2019 | Zimmerman | H04L 9/3247 |
| 2019/0313246 | A1* | 10/2019 | Nix | H04L 9/3263 |

FOREIGN PATENT DOCUMENTS

| | | |
|---|---|---|
| CN | 103067340 A | 4/2013 |
| CN | 103281305 A | 9/2013 |
| EP | 3043535 A1 | 7/2016 |
| WO | 2016/162382 A1 | 10/2016 |

OTHER PUBLICATIONS

A Secure Publish/Subscribe Protocol for Internet of Things Using Identity-Based Cryptography . Peng. ICCSNT. (Year: 2016).*
AUPS: An Open Source AUthenticated Publish/Subscribe system for the Internet of Things. Rizzardi. Elsevier. (Year: 2016).*
Usercentric Federation of Access to Internet-of-Things(IoT) Devices A valet key for IoT devices. Adireddy. IEEE. (Year: 2016).*
Autonomic schemes for threat mitigation in Internet of Things. Ashraf. Elsevier. (Year: 2015).*
WO 2018078825 A1. Lee. (Year: 2018).*
IoT Home Gateway for Auto-Configuration and Management of MQTT Devices.Kim. IEEE. (Year: 2015).*
Secret Forwarding of Events over Distributed Publish/Subscribe Overlay Network. Yoon. (Year: 2016).*
A review on security approaches of MQTT protocol with respect to Internet of Things. Oza. IJRAR. (Year: 2020).*
TTEO (Things Talk to Each Other): Programming Smart Spaces Based on IoT Systems. Yun. Sensors. (Year: 2016).*
Push Notification as a Business Enhancement Technique for E-commerce. Kumar. ICIIP. (Year: 2015).*
Design and Simulation of Energy Efficiency in Node Based on MQTT Protocol in Internet of Things. Asghar. IEEE. (Year: 2015).*
A Survey on IoT Architectures, Protocols, Applications, Security, Privacy, Real-World Implementation and Future Trends. Kraijak. IEEE. (Year: 2015).*
Providing basic security mechanisms in broker-less publish/subscribe systems. Tariq. ACM. (Year: 2010).*
A Case Study on Developing Cloud of Things devices. Uehara. IEEE. (Year: 2015).*
A Security Analysis on Standard IoT Protocols. Zamfir. IEEE. (Year: 2016).*
Interoperability Enhancement for Internet of Things Protocols based on Software-Defined Network. Lee. IEEE (Year: 2016).*
A Context-Aware, Interactive M-Health System for Diabetics. Chang. IEEE. (Year: 2016).*
Affordable Real-time Environment Monitoring System for Greenhouses. Athukorala. IEEE. (Year: 2016).*
Smart Campus Phase One: Smart Parking Sensor Network. Bandara. IEEE. (Year: 2016).*
Smart Building—Towards the Insight Remotely. Suthokumar. IEEE. (Year: 2016).*
OASIS MQTT Version 3.1.1 OASIS Standard, Specification Version, Oct. 29, 2014, 81 pages.

* cited by examiner

SECURING COMMUNICATION OF DEVICES IN THE INTERNET OF THINGS

CROSS-REFERENCE TO RELATED APPLICATIONS

This application is the National Stage Application of International Patent Application No. PCT/US2018/016971 filed Feb. 6, 2018, which claims the benefit of priority to U.S. Provisional Patent Application No. 62/455,071, filed Feb. 6, 2017, the disclosures of which is are incorporated by reference in their entireties.

BACKGROUND

Devices in the Internet of Things (IoT) are often not directly connected to a communication network. Often, small-footprint IoT devices are connected to hubs and gateways, which in turn establish a connection to the Internet. It is a characteristic of such devices that their connection through the gateway is loose. For example, the devices are not always connected to, and reachable by, network services, and their bandwidth can be low. Also, IoT devices often have a long lifetime and are deployed in remote, difficult to reach, areas.

Typical application layer communication protocols for such resource-constrained IoT devices follow simple message-centric paradigms, such as the publish (pub)/subscribe (sub) method for example. An example of a publish/subscribe protocol is the Message Queue Telemetry Transport (MQTT) protocol specified by OASIS. An example of MQTT Publish/Subscribe is depicted in FIG. 2. MQTT is a slim pub/sub messaging protocol that runs over TCP/IP. It can thus be used directly for IoT devices attached to an IP network, such as for wireless connections over 6LoWPAN. For non-IP transport layers, such as Zigbee, a variant MQTT-SN has been specified.

In publish/subscribe protocols, an IoT device typically establishes a loose connection to a server, which can be referred to as an IoT (Message) Broker. The IoT device may send payload data in "publish" messages to the broker, which may be assigned to a certain "topic". Other devices "subscribe" to the mentioned topics at the broker and receive push messages with the aforementioned payload content (or data processed from the payload).

As an example, MQTT typically provides only basic security. For example, MQTT uses identifier/password authentication of a device when it connects to a broker, but other security is left to outside protocol specifications. Application layer encryption of the payload (not specified in MQTT) may be used for confidentiality protection. In some cases, device-server authentication and communication secrecy may be achieved for MQTT by using TLS with X.509 certificates for device authentication.

SUMMARY

It is recognized herein that current messaging protocols for IoT architectures are often weak from a security perspective, and are often poorly suited for resource-constrained devices. An example IoT system described herein combines device authentication and application-layer key establishment using facilities of IoT messaging protocols. The IoT system may include a trust broker node, which acts as a registration point for devices, and an edge gateway node, which manages communication between a given device and the trust broker node (and IoT servers). The edge gateway may acquire a trusted role, such that it may be a secure intermediary for device-server messaging, and such that it can facilitate authentication of devices to services.

In an example, a gateway node receives a connection request from an IoT device. The connection request may indicate an identity associated with the IoT device. The connection request may also indicate an information node with which the IoT device wants to connect. Based on the connection request, the gateway node may determine that the IoT device is not authenticated with the gateway node. Based on the identity associated with the IoT device, the gateway node may select a trust broker node from a plurality of trust broker nodes. The gateway node may establish a proxy rule associated with the IoT device and the selected trust broker node. In accordance with the proxy rule, the gateway node may send the connection request and outbound messages subsequent to the connection request from the IoT device to the selected trust broker node. In some cases, the gateway node may receive a subscribe message from the IoT device. The subscribe message may include a topic. The gateway node may also determine that a publish message from the selected trust broker node is published under the topic, and in response to determining that the publish message is published under the topic, the gateway node may send the publish message to the IoT device. The publish message may include an authentication challenge for the IoT device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

It is recognized herein that popular messaging protocols for IoT architectures are typically weak regarding even basic security. It is further recognized herein that some of the proposed solutions, such as the use of TLS and X.509 certificates for authentication and channel protection, are not well suited for resource-constrained devices and long-lasting IoT deployments. For example, cryptographic certificates that have limited lifetimes are not well suited for long-lasting deployments. Therefore, it is recognized herein that features are lacking in current publish/subscribe protocol-based IoT architectures. For example, in various example embodiments described below, there is a secure authentication of a device to a server (e.g. to the message broker), the secure authentication is efficient so as to not put computational burden on devices and communication overhead on infrastructures, and short-lived keys (which may be analogous to session keys) are established to protect message payloads.

Figure 2:
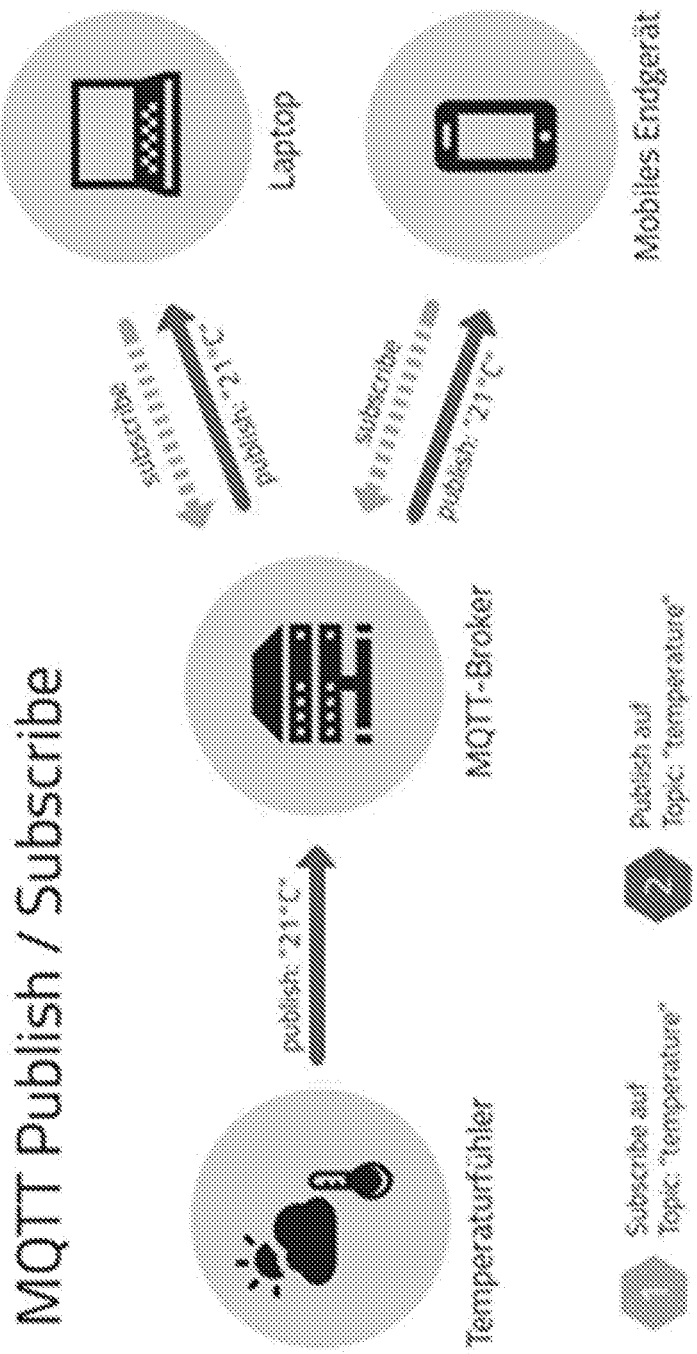
FIG. 2 is an example MQTT Publish/Subscribe System Architecture.
Figure 3:
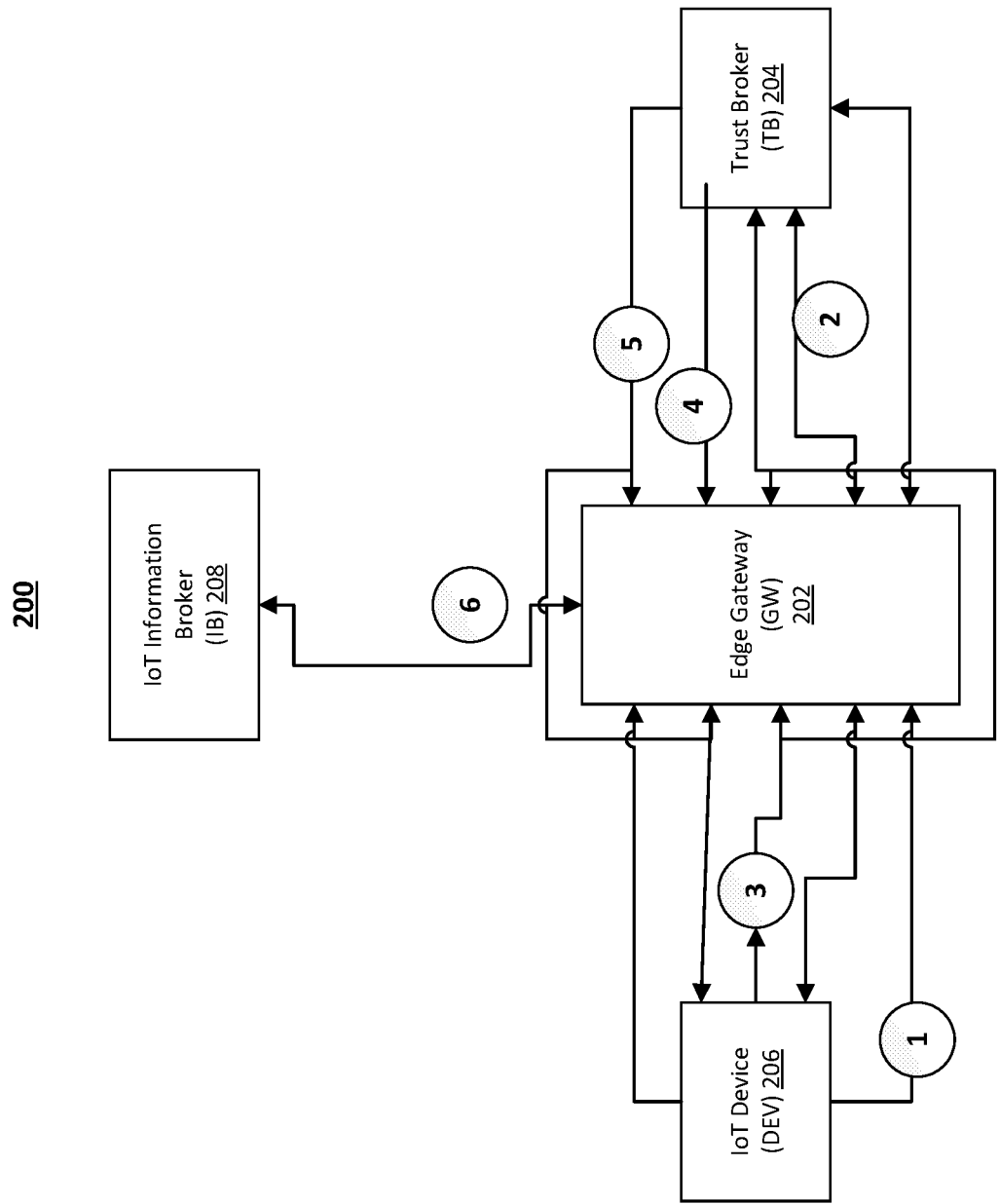
FIG. 3 is illustrates a system diagram and corresponding message flows in accordance with an example embodiment.
Figure 4:
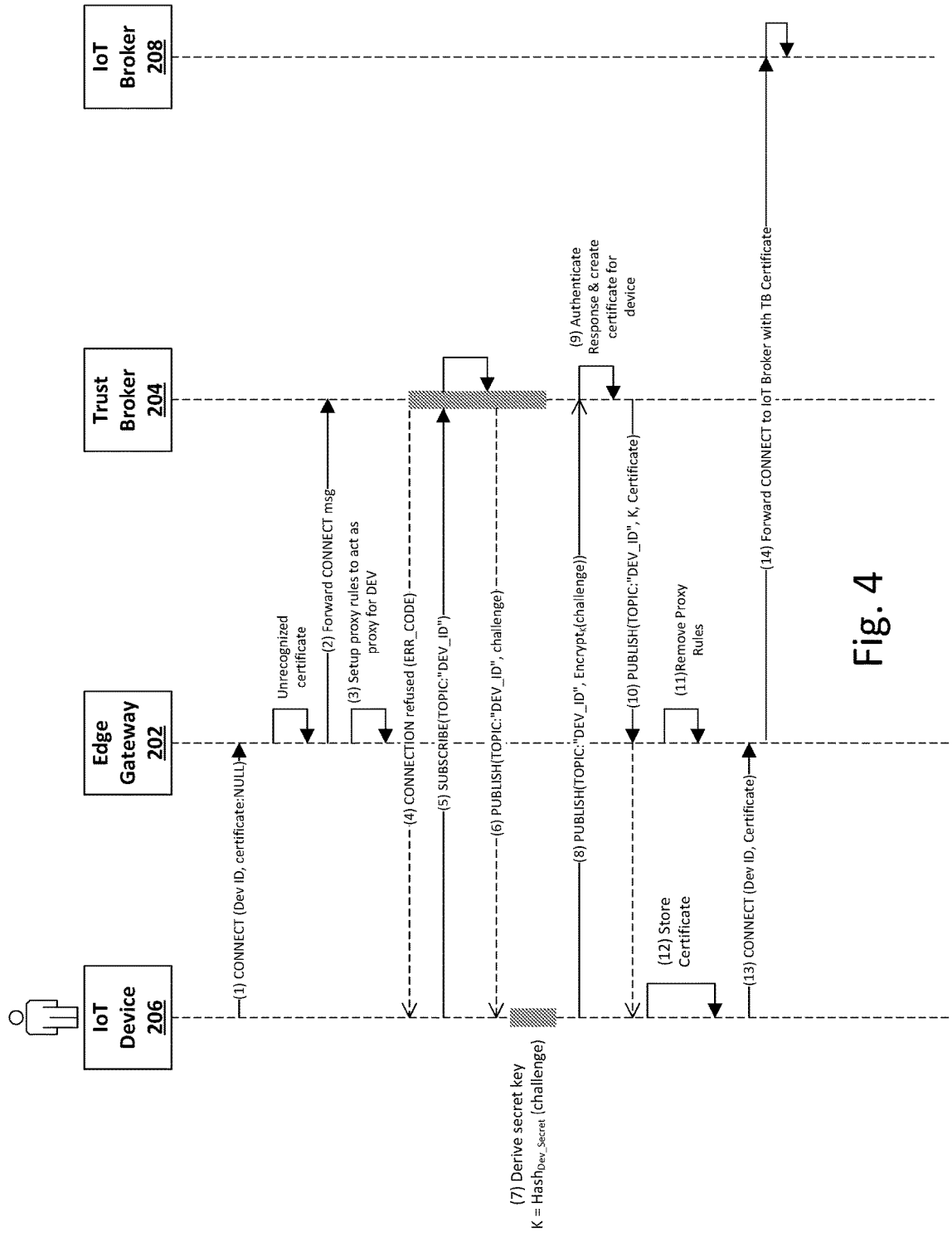
FIG. 4 is a call flow for securing communications for an IoT device in accordance with an example embodiment.

Referring generally to FIGS. 3 and 4, an example IoT system 200 includes an edge gateway or IoT Gateway node 202, which is an entity typically present in IoT architectures, a Trust Broker or Trust Broker node 204, an IoT device 206, and an IoT Information Broker or Information node 208. It will be understood that the network or system illustrated in FIGS. 2 and 3 is simplified to facilitate description of the disclosed subject matter and is not intended to limit the scope of this disclosure. Other devices, systems, and configurations may be used to implement the embodiments disclosed herein in addition to, or instead of, the illustrated networks, and all such embodiments are contemplated as within the scope of the present disclosure.

The Gateway 202 can collaborate with a dedicated server, which may the Trust Broker node 204, to establish desired trust relationships to ensure authenticity and secure device communication, concurrently. In some cases, the IoT Gateway 202 may control the communication of the IoT device 206 as long as the device is unauthenticated, so that it cannot do harm to the IoT system 200. The trust broker 204 may then authenticate the device 206, and release a secret for communication protection to the gateway 202. The device 206, the gateway 202, and other authorized entities may use this secret to protect communication to and from the device 206 on the application layer. Additionally, the trust broker 204 may release credentials to the device 206, which can be used to authenticate the device to an IoT service.

In an example embodiment, there is a registration phase, followed by a connection phase. During registration, in an example, the IoT device 206 may register to a global database of the Trust Broker 204. The global database may include identities of devices that are provided (e.g., installed) by various service providers (e.g., Google). The global database may be used to identify and authenticate a new device. After a given device has been identified and authenticated, it can be registered with the Gateway 202, and enrolled with an Information Broker such as the Information node 208. The Information node 208 may be a service entity connected to the Internet with which IoT devices deployed at various sites may exchange data. In some cases, the IoT Information Broker 208 in particular may provide the IoT data in some rehashed or aggregated form to users, for example, through Web Interfaces or mobile Apps. As used herein, the information node 208 may be specific to IoT information services that use publish/subscribe (PUB/SUB) data methods to receive and distribute information. By way of example, a service may use a protocol such as Message Queue Telemetry Transport (MQTT) to receive operational data from street lights, and the data may be provided as an overlay on a map, to maintenance workers. Subsequently, when a given device re-connects to a given Information Broker, or connects to a new IoT Broker, the gateway 202 can perform a standalone registration procedure, which can be referred to as a connection, with said Broker, without involvement of the Trust Broker 204. This connection phase may be based on a trust relationship between the device 206 and the gateway 202 that is established in the registration phase (e.g., represented by a digital cryptographic token issued by the Trust Broker 204).

Thus, as described further below, in an example, the IoT device 206 can be authenticated to the gateway (GW) 202 and key agreement can be achieved in "one go," which refers to messaging that both yields device authentication as an end result and results in agreement of a shared secret key between the device and a GW. The IoT system 200 can be protected against fake/spoofed devices early on, for example by the GW 202 controlling communication during an authentication stage. In the IoT system 200, according to an example embodiment, there is a separate trust system for flexible device to server authentication. For example, an application layer key may be established for the communication link between the device 206 and the gateway 202, which may also be referred to as device-gateway (DEV-GW) link communication. The gateway 202, which may implemented as an edge gateway 202, may provide streamlined authentication in the connection phase. In an example, the IoT device 206 requires minimal configuration. For example, in some cases, the device 206 does not need to know the identity of the Trust Broker 204. The IoT system 200 may be protected against a spoofed CONNECT attempt. It is recognized herein that CONNECT messages are typically weakly protected and may be inserted by a malicious entity hijacking the communication link between the gateway 202 and the device 206. A spoofed CONNECT message may be protected against by continuous usage of a secret key on the link, as described below with reference to step 6 in FIG. 3. In another example, the GW 202 is established as a trusted middle man for the payload. This may enable additional functions, such as a content firewall at the GW 202 for example.

Embodiments are described below in the context of a publish-subscribe protocol such as MQTT, but it will be understood that other protocols may be implemented as desired. That is, the pub/sub protocols are not the only messaging that can be used for authentication and key agreement.

Referring generally to FIGS. 3 and 4, the example messaging between the illustrated entities adheres to an IoT publish-subscribe messaging protocol, and may include the CONNECT, SUBSCRIBE, and PUBLISH message types, which are now described further. In an example CONNECT message, an entity, such as an IoT device or a user agent, requests a connection to a server. In particular, the entity may request for permission to send and receive payload via their messages. The CONNECT request may be accompanied by (or may include) an authentication credential, such as an identifier/password pair or a cryptographic token for example. CONNECT messages may induce a response. Using an example SUBSCRIBE message, an entity can subscribe to a TOPIC with a data source, for example via an IoT information broker. The entity may then receive all new messages stored under this TOPIC label in the broker database, via PUBLISH messages (payload). In an example PUBLISH message, an entity may submit a new payload to another entity, under a certain TOPIC. In this way, IoT devices may submit data (e.g., measurement values) to IoT brokers, and other clients (e.g., user agents) that are subscribed to said topic may receive the payload.

Referring now in particular to FIG. 3, a flow diagram for device authentication, payload secrecy protection, and authenticated connection to an example IoT service is shown. In accordance with the illustrated example, the device 206 may begin in a simple, initial configuration. For example, the device 206 may know its own identifier and the Internet address of the IoT Information node 208 with which it wants to connect, but it might not possess an authentication/access credential for the Information node 208. In some cases, the device 206 possesses a secret value (e.g., a symmetric key or an asymmetric, private cryptographic key), which generally allows authentication of the device 206. Even with such scarce data pre-provisioned, the illustrated example enables registration of the device and establishment of target trust relationships.

At 1, in accordance with the illustrated example, the device 206 establishes a (possibly insecure) communication link to the edge gateway 202. The device 206 may submit a connection request, for instance a CONNECT message, directed to the IoT information node 208. Thus, the gateway 202 may receive the connection request from the IoT device 206, and the connection request may indicate an identity associated with the device 206, and an identity associated with the information node 208 with which the IoT device 206 wants to connect. The connection request may also contain an empty or default credential value. Based on the connection request, the GW 202 may determine that the IoT device is not authenticated with the gateway node 202. For example, the GW 202 may recognize that the device with the provided identifier is not registered to the gateway 202. Alternatively, in accordance with another example, at 1, the device 206 submits a credential, such as a digital certificate for example, with the connection request. The submitted credential may contain a timestamp or may otherwise indicate a time during which the credential is valid. Based on the timestamp associated with the credential, for example, the GW 202 may determine that the credential is outdated. Thus, the GW 202 may determine that that the device 206 is not currently registered with the GW 202. Continuing with the example, when the timestamp indicates that the credential has not expired, and thus indicates that the credential is valid or fresh, the device 206 may be immediately registered with the GW 202, without undergoing an authentication described subsequently. In this way, in some cases, a given GW may accept devices as registered when the devices have already authenticated successfully with another trusted node, for instance a neighbouring GW.

Based on the device identity, for example, the GW 202 may select the trust broker node 404 from a plurality of trust broker nodes. This selection can be performed in different ways. For instance, the trust broker 404 may be selected based on the device identifier or a part of said identifier that is associated with the specific trust broker 404. In an example, a range of identifiers are associated with a specific trust broker. In another example, the type of the device 206 may be used to select the trust broker. One or more specific trust brokers may be assigned to serve devices of a specific type or types. By way of example, a specific trust broker may be associated with temperature sensors exclusively, such that the GW 202 may select the trust broker based on determining that the device that sent the connection request is a temperature sensor. Alternatively, or additionally, the communication channel by which the device connects to the GW 202 may be used to select the trust broker. One or more specific trust brokers may be assigned to serve devices that communicate with the GW over a communication channel of a certain type or types. By way of example, devices connecting to the BW through the Bluetooth LE standard may be directed to one trust broker, while another trust broker might be associated with devices connecting via ZigBee. In some cases, the GW 202 may configure a proxy rule, such as a routing rule for example, so that all outbound messages from the device are routed to the selected trust broker node 204. The proxy rule may also require that only messages from the selected trust broker node 204 are forwarded to the device 206, effectively containing communication to or from the device 206 to a single channel between the device 206 and the trust broker node 204, via the GW 202. Thus, in accordance with the proxy rule associated with the IoT device 206 and the trust broker 204, the GW may transmit the connection request (e.g., the CONNECT message) to the selected trust broker 204. In an example, the GW 202 may receive an inbound message from the selected trust broker node 204, and, in accordance with the proxy rule, the GW 202 sends the inbound message to the IoT device 206.

At 2, in accordance with the illustrated example, the trust broker node 204 may respond to the connection request with a message indicating that the connection is refused. In an example, the trust broker node 204 responds to the device 206 via the gateway 202. In some cases, the trust broker 204 may further provide a specific, pre-determined error code. Upon receipt of the refusal message, the device 206 may send a message, for instance a SUBSCRIBE message, to the trust broker node 204. The message may include a request for a subscription to a specific topic (e.g., "auth-registration: DEV-ID"). In some cases, the device 206 sends this message to the information node 208. Thus, for example, in some cases, the device 206 does not need to know the address of the trust broker 204 due to the proxy rule at the GW 202. The trust broker 204 may PUBLISH data to the device 206 under the topic to which the device 206 subscribes, so that the device 206 receives the data. The trust broker 204 may publish messages in order to initiate authentication of the device 206. For example, the trust broker 204 may publish a challenge value for the device 206.

At 3, in accordance with the illustrated example, the device 206 creates authentication response data in response to the publish message from the trust broker 204. In an example, the device 206 encrypting the challenge value received from the trust broker 204 with a secret key that the device 206 shares with the trust broker 204. The device 206 may PUBLISH the authentication response to the trust broker 204 under the same topic under which the trust broker 204 published the authentication challenge. The device 206 may also derive a secret key K, for example, using the challenge value and its own secret.

At 4, in accordance with the illustrated example, the trust broker 204 validates the authentication response. If the validation is successful, in an example, the trust broker may PUBLISH the secret key K under the above-mentioned topic. The gateway 202 may capture the PUBLISH message, and extract and store the key K from the message. In an example, the PUBLISH message is not forwarded to the device 206.

At 5, in accordance with the illustrated example, the trust broker 204 generates a service access token or another digitally signed message such as a certificate. The trust broker 204 may publish the IoT service access token or the like under the same topic as described above. Thus, the gateway 202 may capture the PUBLISH message, and extract and store the service access token or the like. In some cases, the GW may replace the payload (e.g., service access token) in the PUBLISH message with some predetermined value (e.g., "register-OK:DEV-ID". The payload may be encrypted with the key K, so as to define a modified PUBLISH message. The modified PUBLISH message may be forwarded to the device 206. The device 206 may decrypt the modified PUBLISH message, and upon successful decryption, resume normal operation by restarting a connection attempt with (e.g., by sending another CONNECT message to) the information node 208.

In the above-described example, the edge gateway 202 gates the communication of the device 206 so that the device 206 can only communicate with the Trust Broker 204 when authentication has been successful (e.g., after step 4). After completion of this step, the gateway 202 may release the communication path restriction on the device 206, for instance by removing the proxy rule. That is, the gateway 202 may receive a trust message from the trust broker node 204 indicating that a trust establishment exchange has been completed between the trust broker node 204 and the device 206. In response to the trust message, the gateway 202 may remove the proxy rule such that outbound messages from the device 206 are sent to the information node 208. For instance, the device 206 may send a subsequent or second connection request toward the information node 208 via the gateway 202, and the gateway 202 may send the second connection request to the information node 208 after determining that the device 206 has been authenticated.

In an example, steps 1-5 described above complete the registration phase of the device. From this point on, the device 206 may establish a connection to the IoT information broker node 208, which is trusted by using the authentication credential. Further, the payload on the link from device 206 to the gateway 202 may is protected by the secret shared key K. In various examples, this connection setup may be performed any time and multiple times, without further involvement of the trust broker 204. In an example, after step 5, payloads, for instance all payloads in messages on the link between the gateway 202 and the device 206, may be encrypted with the secret key K.

Still referring to FIG. 3, in accordance with the illustrated example, at 6, the device 206 CONNECTs to the information node 208 with data that may contain the device identifier and some pre-determined value for the authentication credential. This pre-determined value may, for instance, be a time-stamp that is encrypted with the secret key K. The gateway 202 may decrypt the authentication credential data field and validate the contained data using some pre-determined mechanism, for instance, by verifying that the time-stamp is recent as compared to a predetermined threshold. Upon success of the above-mentioned data validation, the gateway 202 may replace the authentication credential data field in the CONNECT message with the previously stored service access credential for the device 206. Various mechanisms to guarantee freshness of said credential may be applied. For instance, the gateway 202 may insert a current time stamp into said message, which can then be compared by a receiver with a validity period for said credential. Additionally, or alternatively, a nonce or hash value may be inserted so that the receiver may verify that the message is not replayed by another entity. The gateway 202 may forward the modified CONNECT message to the information node 208. The information node 208 may validate the service access token, and, upon success, respond with a CONNECT SUCCESS message. The device 206 may PUBLISH data with an encrypted payload under some topic to the information node 208. The gateway 202 may decrypt the payload, and replace the payload in the original message with the decrypted payload. In some cases, this yields implicit source authentication of each message. The gateway 202 may forward the PUBLISH message to the information node 208.

In some cases, the key K is renewed at some time, or periodically. For this, the gateway 202 and the device 206 may perform, for instance, a Diffie-Hellmann (D-H) key agreement procedure over the messaging channel in a way that is analogous to the method described with reference to FIG. 3, wherein the payload of the D-H procedure is encrypted with the previous key K.

Referring now to FIG. 4, in accordance with the illustrated example, at 1, the device 206 sends an outbound message, for instance a connection request (CONNECT message), to a server, for instance the IoT information node 208. The gateway 202 receives the connection request, which may indicate an identity associated with the device 206 and the information node 208 with which the device 206 wants to connect. Based on the connection request, the gateway 202 may determine that the device 206 is not authenticated or registered with the gateway 202. For example, the gateway 202 may determine that no valid credential is present in the connection request. In accordance with the illustrated example, the connection request may contain a certificate, and the gateway 202 may determine that it does not recognize the certificate. At 2, in accordance with the example, the GW determines that the message type of the message at 1 is a connection request. In response to determining that the outbound message received at 1 is a connection request, and in response to determining that the outbound message does not include a valid credential for communication, the gateway 202 may send information from the outbound message to the selected trust broker 204. In some cases, the gateway 202 may select the trust broker 204 from a plurality of trust brokers. For example, the trust broker 204 may be a pre-determined entity whose address is configured in the gateway 202. By way of example, the trust broker 204 may be a service provided by a telecom provider that deploys gateways to a given user's sites. The gateways, in some cases, may be a combination of Internet routers and IoT gateways. In some examples, the trust broker 204 may contain a directory of known IoT devices from various device manufacturers and/or IoT service providers. In an example scenario, the IoT service providers may deliver the identifiers and other data associated with its IoT devices to trust brokers upon roll out of said devices.

Still referring to FIG. 4, the gateway 202 may forward the connection request to the trust broker 204 using various routing rule and proxy mechanisms. In an example, messages, for instance every message from the IoT device 206, are first captured and processed by the gateway 202 and then, if appropriate, forwarded to the trust broker 204 over the Internet, for example using TCP for transport (e.g., see step 3). Thus, for example, the gateway 202 may receive a plurality of inbound messages destined for the IoT device 206, and the plurality of inbound messages may be from a plurality of network nodes. In some examples, in accordance with a proxy (routing) rule, the gateway 202 only sends the plurality of inbound messages that are from the trust broker 204 to the IoT device 206.

At 4, in accordance with the illustrated example, the device 206 may receive an error code from the trust broker 204 indicating that the connection attempt is refused. At 5, the device may then try to send a SUBSCRIBE message to the information node 208, which may then be routed to the selected trust broker 204 in accordance with the example proxy and routing functions described above. Thus, for example, the device 206 might not know the identity of the trust broker 204. In some cases, the device 206 might only know its "parent" entity represented by the information node 208, to which it tries to make contact. The gateway 202 may then take care of contacting the trust broker 204 for the device 206.

The message at 5 may include a topic and an identifier of the device 206. At 6, in response to the SUBSCRIBE message, the trust broker 204 may send a PUBLISH message to the device 206. At 7, the device 206 may derive a secret key based on a challenge received from the trust broker 204 in the PUBLISH message, and a device secret. At 8, the device 206 may send a PUBLISH message to the trust broker 204. The PUBLISH message may include the challenge encrypted with the secret key. At 9, based on the received PUBLISH message, the trust broker 204 may authenticate the response received from the device 206 by decrypting the challenge using its own version of the secret key K. In some cases, trust broker nodes may be provisioned by the manufacturers of IoT devices with respective keys. The keys may be keys for symmetric encryption and decryption. Alternatively, in some cases, the trust broker 204 may submit the response received at 8 to a trusted third party for evaluation. In these cases, at 9, the trust broker 204 may receive a response from the trusted third party, and the response may indicate whether the device 206 is authenticated. In some cases, the trust broker 204 also holds the secrets of all known devices for the authentication at 9. If the authentication is successful, the trust broker 204 may create a service access certificate for the device 206. The trust broker 204 may send the certificate to the gateway 202, at 10. Thus, the gateway 202 may receive an inbound message from the trust broker 204, which is directed to the device 206. The message may be trust message from the selected trust broker node 204 indicating that a trust establishment exchange has been completed between the trust broker node 204 and the IoT device 206. For example, the inbound message, which may be a PUBLISH message, may include a valid credential for communication (e.g., the certificate). The gateway 202 may forward the message to the device 206. At 11, in response to the trust message, the gateway 202 may remove the proxy rules associated with the device 206 such that outbound messages from the IoT device are sent to the information node 208. At 12, the device 206 may store the valid credential for communication, for example the certificate in accordance with the illustrated example. At 13, the device 206 may send another outbound message, for instance a second connection request (e.g., a CONNECT message) to the gateway 202, addressed toward the information node 208. This outbound message may include the valid credential for communication. At 14, the gateway 202 may forward the outbound message to the information node 208. The gateway 202 may also send a trust broker certificate to the information node 208 with the forwarded connection request message, for example. The information node 208 may validate the certificate and acknowledge the connection with the device 206 by an appropriate response message (not shown). The contents of messages, for instance all messages, between the device 206 and the gateway 202 may be encrypted using the established shared secret key from step 13 onwards, in an example.

Thus, as described above, a server, for instance an IoT gateway, may receive an outbound message from a device. The outbound message may include a connection request. Based on the outbound message, the gateway may determine that the device is not registered with the gateway. The gateway may configure and implement a first routing rule such that messages from the device are routed to a trust broker. The gateway may also configure and implement a second routing rule such that only messages that are from the trust broker are sent to the device. The gateway may send the outbound message to the trust broker. In response to the outbound message, the gateway may receive a second message that indicates that the connection request is refused. In an example, after the device is authenticated, the gateway may receive a third message from the trust broker. The gateway may extract a key from the third message, and refrain from forwarding the third message to the device. The gateway may receive a fourth message from the trust broker, which may contain a service access token. The gateway may extract the service access token from the fourth message. In an example, the gateway replaces the service access token in the fourth message with a predetermined value to define a fifth message. The gateway may encrypt the fifth message with the key to define an encrypted fifth message, and send the encrypted fifth message to the device, such that the device, based on the predetermined value, can initiate a new connection request that is successful.

As also described above, in an example, a trust broker authorizes access of an IoT device by receiving a connection request from the device, and in response to the connection request, publishing a challenge message for the device. The trust broker may receive a challenge response from the device in response to the challenge message, wherein the challenge response is generated by hashing the challenge message with a secret key that is specific to the device. In response to confirming that the challenge response matches an expected response, the trust broker may generate a certificate for the device, and generate a key for a connection between the device and a gateway. Further, in an example, the trust broker may remove proxy rules in the gateway to enable the device to connect to the internet.

FIGS. 3 and 4 and the description related thereto illustrate various embodiments of methods and apparatuses for securing communications associated with IoT devices. In these figures, various steps or operations are shown being performed by one or more nodes, devices, functions, or networks. It is understood that the nodes, devices, functions, or networks illustrated in these figures may represent logical entities in a communication network and may be implemented in the form of software (e.g., computer-executable instructions) stored in a memory of, and executing on a processor of, a node of such network, which may comprise one of the general architectures illustrated in FIGS. 1A and 1C-E described below. That is, the methods illustrated in FIGS. 3 and 4 may be implemented in the form of software (e.g., computer-executable instructions) stored in a memory of a network node or apparatus, such as for example the node or computer system illustrated in FIG. 1B, which computer executable instructions, when executed by a processor of the node, perform the steps illustrated in the figures. It is also understood that any transmitting and receiving steps illustrated in these figures may be performed by communication circuitry of the node under control of the processor of the node and the computer-executable instructions (e.g., software) that it executes.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," "entity," and "network node" may be used interchangeably.

Figure 1A:
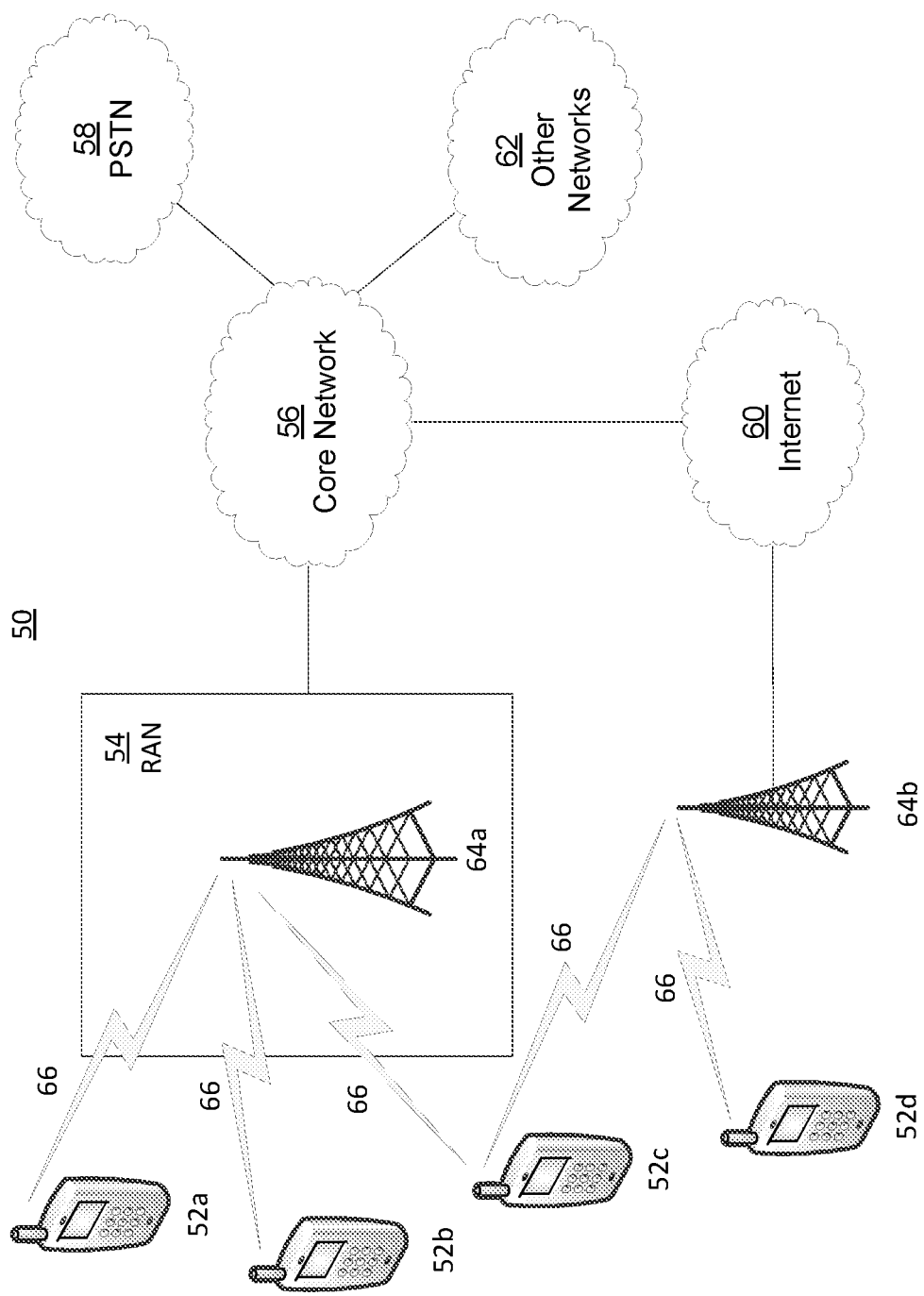
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs), e.g., WTRUs, 102a, 102b, 102c and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in some embodiments, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In some embodiments, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
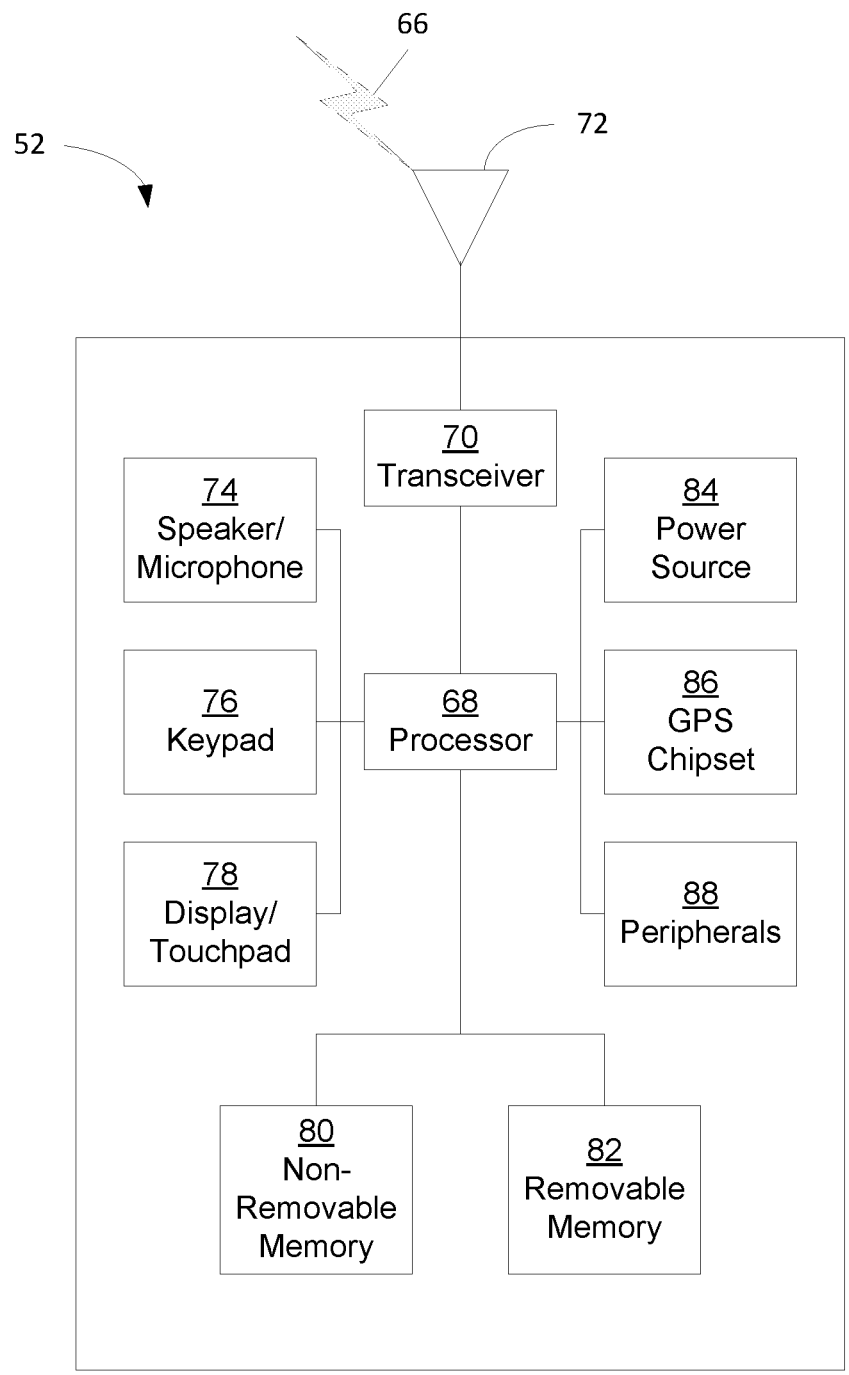
FIG. 1B is a system diagram of an example WTRU that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in some embodiments, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in some embodiments, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
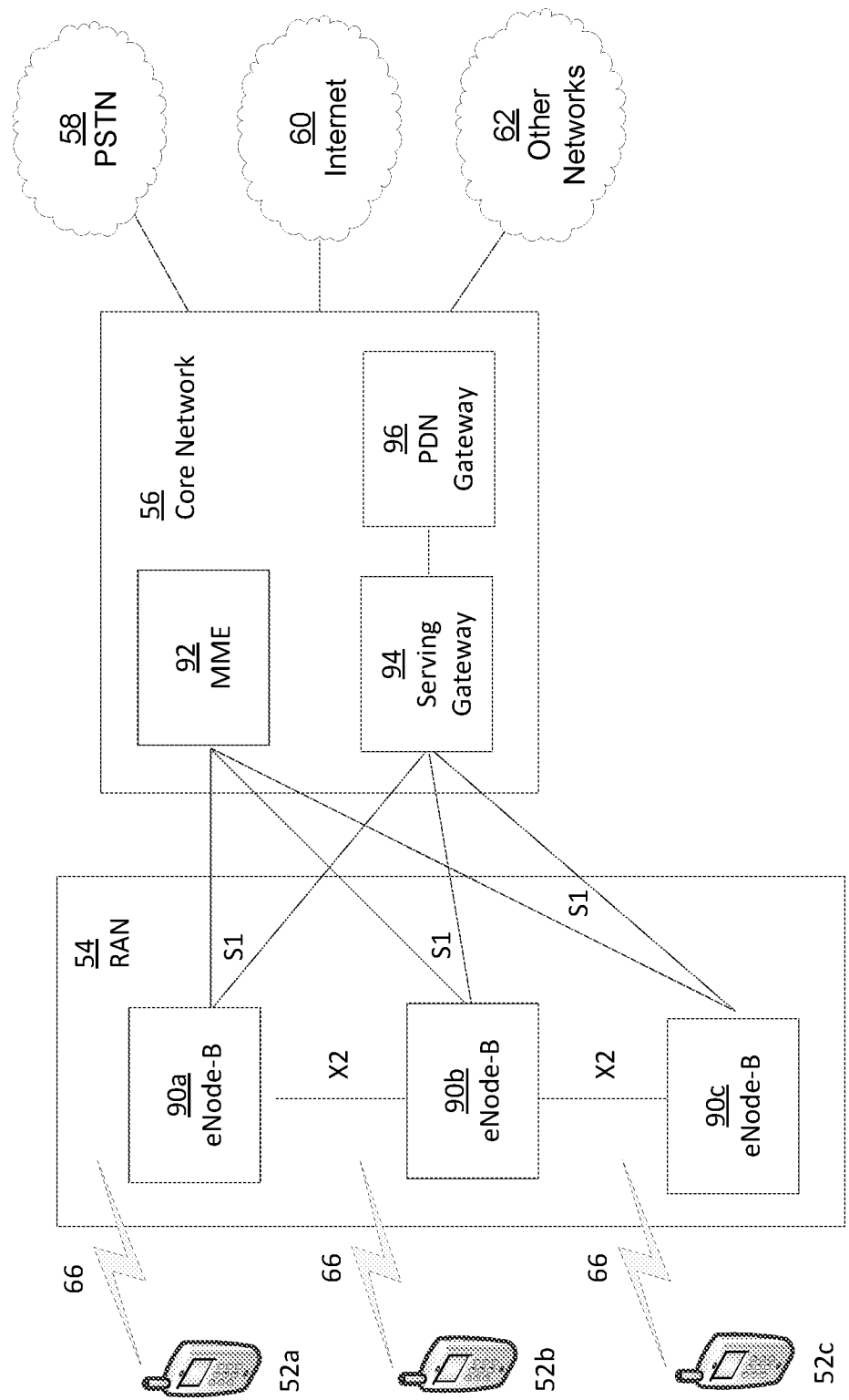
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
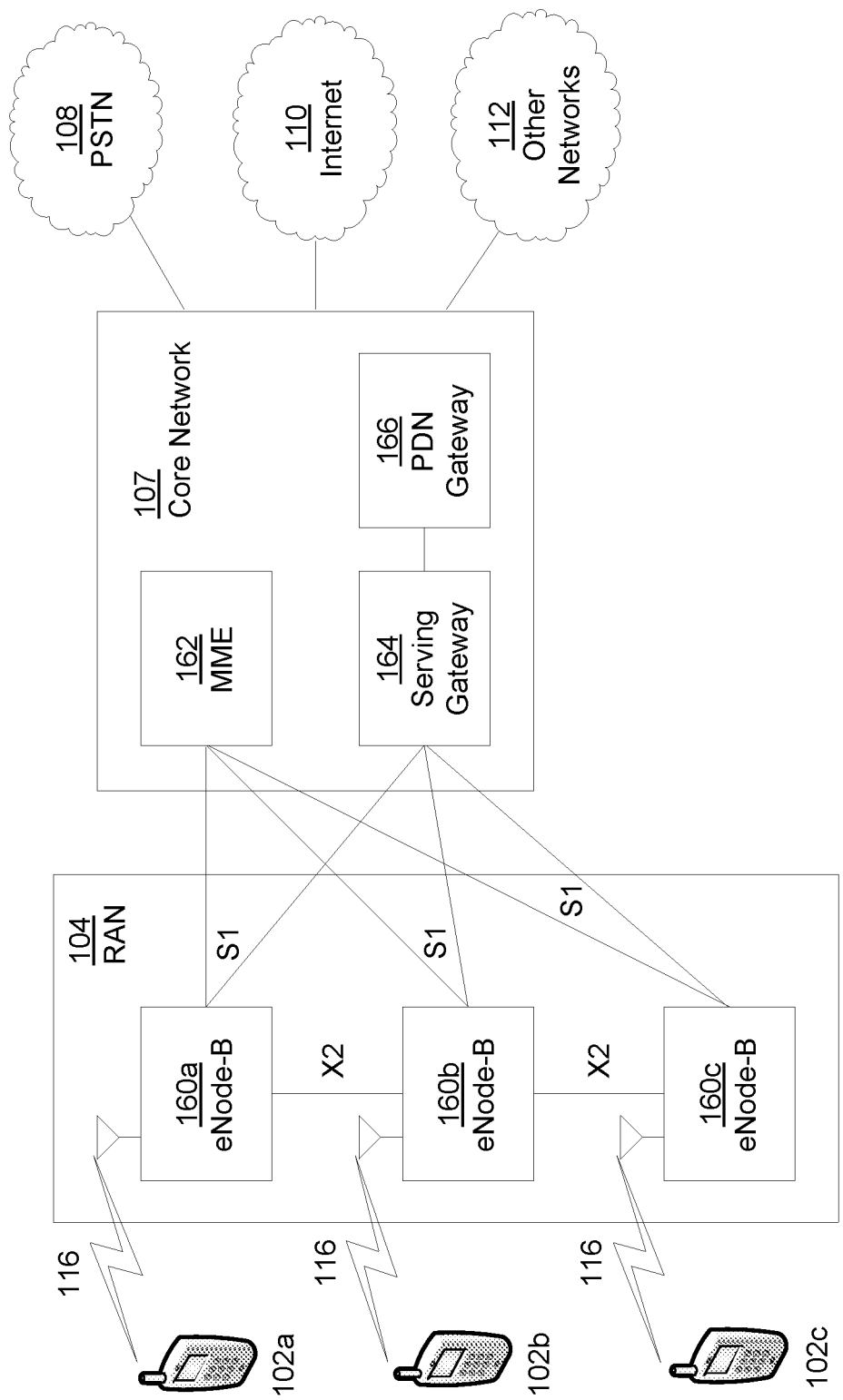
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In some embodiments, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink (UL) and/or downlink (DL), and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
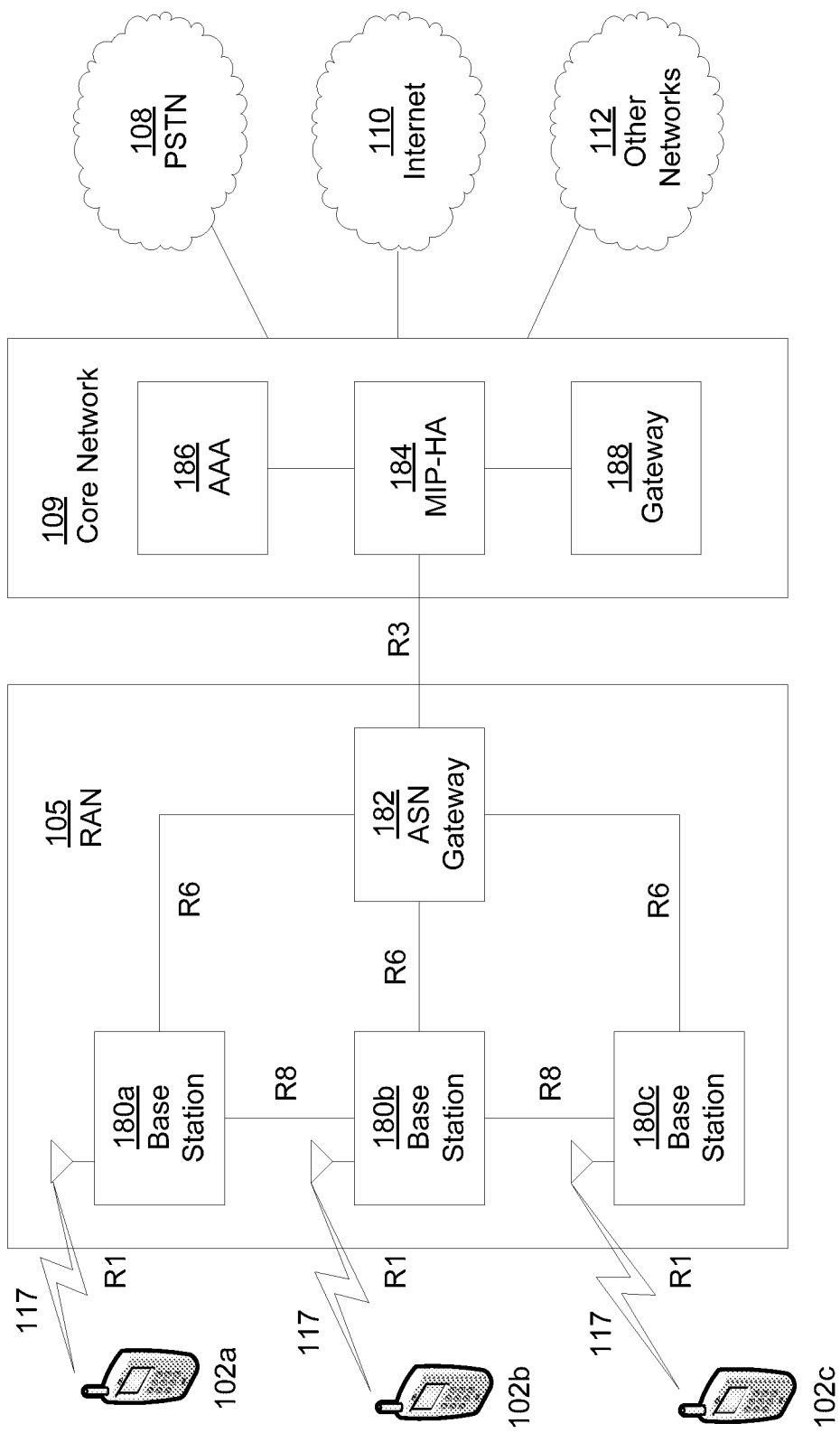
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In some embodiments, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Mobile phones (e.g. UEs or WTRUs) have evolved from voice centric monochrome devices with a minuscule screens and little processing power to devices with high resolution, palm sized screens and data processing power rivaling laptop computers. This transformation, coupled with an expanding cache of bandwidth hungry applications, has triggered demands for higher data rates. Mobile data traffic reportedly grew more than 24-fold between 2010 and 2015 and may grow more than 500-fold between 2010 and 2020. This has, in turn, propelled the uptake of 4G network equipment contracts and driven operators worldwide to deploy 4G networks. 4G supports high data rates (e.g. up to 1 Gbit/s) on the downlink.

Attention is turning from 4G towards next generation (e.g. 5G) technologies. Use cases that may influence 5G system architecture may include Enhanced Mobile Broadband (eMBB) connectivity, Massive Machine Type Communications (mMTC) and Ultra-Reliable Critical Communications (URCC) services.

5G may support higher data rates for uplink (UL) and downlink (DL). For example, uplink data throughput may be as high as or may exceed downlink data throughput. 5G may improve coverage and user experience, e.g., with higher data rate, lower latency and improved energy efficiency. IEEE 802.11 High Efficiency Wireless (HEW) may increase the presence of cellular operators, which may amalgamate different access technologies developed in different Standards Development Organizations (SDOs) to support future connectivity and data rates. 5G throughput and connectivity may be provided by multiple interconnected communication standards, which may, for example, range from wireless metropolitan area networks down to wireless personal area networks and wired networks.

Massive connectivity may be driven by the variety of things or objects (e.g. RFID tags, sensors, actuators and mobile phones) in the environment around us, which may be referred to as the Internet of Things (IoT). Objects or devices may interact with each other in a variety of ways and may generate huge amounts of data. The IoT and the Internet have converged and may continue converging with a multitude and variety of service scenarios. 5G systems may connect loosely defined smart objects (e.g. M2M or IoT devices) and may enable them to interact with other objects, e.g., to yield productivity and automation gains through predictive, actionable intelligence. For example, mobile devices may adopt silent mode when entering a meeting room per a request of a meeting moderator (e.g. indicated in a policy), may alert a user to and/or turn off the radio on the user's mobile phone before entering sensitive medical areas or may detect when a user enters a car and automatically connect to its sound system. Wireless sensors may let people check where their pet is in real-time and may control the temperature for each room of their home while they are out. Emergency services may be remotely and automatically alerted, for example, when a fire is detected in a building or when a patient's medical parameters shift beyond a critical threshold.

5G may provide increased service reliability for mission critical communications services such as intelligent transportation systems. 5G systems may provide resiliency and reliability.

5G wireless systems may improve data rates, efficiency and may enable new IoT services. 5G technologies may support traffic growth of 1000 times, for example, without a corresponding increase in CAPEX and OPEX costs. 5G system architecture may reduce costs for Mobile Operators or Service Providers. Cost reduction and flexibility for wireless networks may be achieved, for example, by reducing dependency on dedicated network functions and switching to generic COTS platforms, such as cloud computing utilizing virtualization technologies.

5G systems may provide automation and remote interaction. There may be security and privacy issues associated with 5G networks.

5G networks may be designed to connect industries, such as manufacturing and processing, intelligent transportation, smart grids and e-health. Different environments may cause issues for speed, latency and heterogeneity. Interaction by different platforms may mean different protocols, different interfaces and different policies (e.g. QoS requirements). Diverse service contexts may introduce various security and privacy considerations. For example, an e-health information system may have more privacy than a Home Automation System (HAS) that may have more security for Control Plane (CP) signaling. Network data handling capabilities may be improved to accommodate a large volume of data transported, stored and/or processed in 5G systems. Radio Network equipment that supports higher frequencies (e.g. Millimeter wave (mmW) 30 GHz+) and core networks that store, forward and process data may be deployed, which may increase CAPEX and associated OPEX expenditures by mobile network service providers.

Processes and instrumentalities described herein may apply in any combination and may apply to other networks and wireless technologies. Although features and elements (including procedural steps) described herein in various examples may be shown or described in particular combinations and/or orders, each feature and element may be used alone or in any combination and in any order with and without other features and elements. Although examples provided herein may pertain to New Radio (NR) or 5G-specific protocols, subject matter described herein is not limited to provided examples or referenced communication technologies. Subject matter herein is applicable to a wider variety of examples and implementations, including in other wireless systems.

A WTRU or UE may refer to an identity of the physical device, or to the user's identity such as subscription related identities, e.g., MSISDN, SIP URI, etc. WTRU (UE) may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, terminal, base station, RNC, and/or any host computer.

What is claimed:

1. A gateway node in a network, the gateway node comprising a processor and a memory, the gateway node further comprising computer-executable instructions stored in the memory of the gateway node, which, when executed by the processor of the gateway node, cause the gateway node to perform operations comprising:
   receiving a connection request from a device, the connection request indicating an identity associated with the device;
   based on the identity associated with the device, communicating with a trust broker node;
   and subsequent to the connection request, preventing the sending of outbound messages from the device to network nodes other than the trust broker node.

2. The gateway node as recited in claim 1, the gateway node further comprising computer-executable instructions stored in the memory of the gateway node, which, when executed by the processor of the gateway node, cause the gateway node to perform further operations comprising:
   receiving a subscribe message from the device, the subscribe message including a topic;
   determining that a publish message from the trust broker node is published under the topic; and
   in response to determining that the publish message is published under the topic, sending the publish message to the device, the publish message including an authentication challenge from the trust broker node.

3. The gateway node as recited in claim 2, the gateway node further comprising computer-executable instructions stored in the memory of the gateway node, which, when executed by the processor of the gateway node, cause the gateway node to perform further operations comprising:
   in response to the authentication challenge, receiving an authentication response from the device;
   based on the authentication response, receiving a certificate for the device, from the trust broker node, the certificate enabling the device to connect to an information node.

4. The gateway node as recited in claim 1, the gateway node further comprising computer-executable instructions stored in the memory of the gateway node, which, when executed by the processor of the gateway node, cause the gateway node to perform further operations comprising:
receiving an inbound message from the trust broker node; and
sending the inbound message to the device.

5. The gateway node as recited in claim 1, the gateway node further comprising computer-executable instructions stored in the memory of the gateway node, which, when executed by the processor of the gateway node, cause the gateway node to perform further operations comprising:
receiving a plurality of inbound messages destined for the device, the plurality of inbound messages from a plurality of network nodes; and
only sending to the device inbound messages of the plurality of inbound messages that are from the trust broker node.

6. The gateway node as recited in claim 1, the gateway node further comprising computer-executable instructions stored in the memory of the gateway node, which, when executed by the processor of the gateway node, cause the gateway node to perform further operations comprising:
receiving a trust message from the trust broker node indicating that a trust establishment exchange has been completed between the trust broker node and the device; and
in response to the trust message, sending outbound messages from the device to an information node.

7. The gateway node as recited in claim 6, the gateway node further comprising computer-executable instructions stored in the memory of the gateway node, which, when executed by the processor of the gateway node, cause the gateway node to perform further operations comprising:
after the trust establishment exchange has been completed, receiving a second connection request, from the device, to connect to the information node;
determining that the device has been authenticated; and
based on determining that the device has been authenticated, sending the second connection request to the information node.

8. The gateway node as recited in claim 7, wherein determining that the device has been authenticated comprises determining that the device is registered with the gateway.

9. The gateway node as recited in claim 6, the gateway node further comprising computer-executable instructions stored in the memory of the gateway node, which, when executed by the processor of the gateway node, cause the gateway node to perform further operations comprising:
after the trust establishment exchange has been completed, receiving a key message from the trust broker;
extracting a key from the key message; and
using the key to authenticate other devices in the network.

10. A method comprising:
receiving a connection request from a device, the connection request indicating an identity associated with the device;
based on the identity associated with the device, communicating with a trust broker node;
subsequent to the connection request, preventing the sending of outbound messages from the device to network nodes other than the trust broker node.

11. The method as recited in claim 10, the method further comprising:
receiving a subscribe message from the device, the subscribe message including a topic;
determining that a publish message from the trust broker node is published under the topic; and
in response to determining that the publish message is published under the topic, sending the publish message to the device, the publish message including an authentication challenge from the trust broker node.

12. The method as recited in claim 11, the method further comprising:
in response to the authentication challenge, receiving an authentication response from the device;
based on the authentication response, receiving a certificate for the device, from the trust broker node, the certificate enabling the device to connect to an information node.

13. The method as recited in claim 10, the method further comprising:
receiving an inbound message from the trust broker node; and
sending the inbound message to the device.

14. The method as recited in claim 10, the method further comprising:
receiving a plurality of inbound messages destined for the device, the plurality of inbound messages from a plurality of network nodes; and
only sending to the device inbound messages of the plurality of inbound messages that are from the trust broker node.

15. The method as recited in claim 10, the method further comprising:
receiving a trust message from the trust broker node indicating that a trust establishment exchange has been completed between the trust broker node and the device; and
in response to the trust message, sending outbound messages from the device to an information node.

16. The method as recited in claim 15, the method further comprising:
after the trust establishment exchange has been completed, receiving a second connection request, from the device, to connect to the information node;
determining that the device has been authenticated; and
based on determining that the device has been authenticated, sending the second connection request to the information node.

17. The method as recited in claim 16, wherein determining that the device has been authenticated comprises determining that the device is registered with a gateway.

18. The method as recited in claim 15, the method further comprising:
after the trust establishment exchange has been completed, receiving a key message from the trust broker node;
extracting a key from the key message; and
using the key to authenticate other devices in the network.

19. The gateway node of claim 1, wherein the computer-executable instructions, when executed, further cause the gateway node to determine, based on the connection request, that the device is not authenticated with the gateway node.

20. The gateway node of claim 1, wherein preventing the sending of outbound messages from the device to network nodes other than the trust broker node comprises applying a proxy rule to the outbound messages.

21. The gateway node of claim 20, wherein the proxy rule comprises a routing rule that causes outbound messages from the device to be routed to the trust broker node.

22. The method of claim 10, further comprising determining, based on the connection request, that the device is not authenticated with the gateway node.

23. The method of claim 10, wherein preventing the sending of outbound messages from the device to network nodes other than the trust broker node comprises applying a proxy rule to the outbound messages.

24. The method of claim 23, wherein the proxy rule comprises a routing rule that causes outbound messages from the device to be routed to the trust broker node.

\* \* \* \* \*